United States Patent
Abe et al.

(10) Patent No.: US 8,553,328 B2
(45) Date of Patent: Oct. 8, 2013

(54) ZOOM LENS SYSTEM

(75) Inventors: Tetsuya Abe, Hokkaido (JP); Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 49 days.

(21) Appl. No.: 13/415,083

(22) Filed: Mar. 8, 2012

(65) Prior Publication Data
US 2012/0229912 A1    Sep. 13, 2012

(30) Foreign Application Priority Data
Mar. 11, 2011    (JP) .................................. 2011-053702

(51) Int. Cl.
*G02B 15/14* (2006.01)

(52) U.S. Cl.
USPC ............ 359/557; 359/680; 359/682; 359/683; 359/684; 359/685; 359/689; 359/716; 359/740; 359/784

(58) Field of Classification Search
USPC ................. 359/557, 680, 682–685, 689, 716, 359/740, 784
See application file for complete search history.

(56) References Cited

U.S. PATENT DOCUMENTS

| | | | | |
|---|---|---|---|---|
| 5,835,272 A * | 11/1998 | Kodama | ........................ | 359/557 |
| 5,847,875 A * | 12/1998 | Kodama et al. | ................ | 359/557 |
| 6,498,688 B2 * | 12/2002 | Shibayama | ................... | 359/689 |
| 6,671,103 B2 * | 12/2003 | Itoh | .............................. | 359/689 |
| 6,771,430 B2 * | 8/2004 | Obama | ......................... | 359/682 |
| 7,042,650 B2 * | 5/2006 | Hagimori et al. | ............ | 359/682 |
| 7,215,483 B2 * | 5/2007 | Sekita | ............................ | 359/682 |
| 7,221,517 B2 * | 5/2007 | Terada et al. | ................. | 359/682 |
| 7,324,289 B2 * | 1/2008 | Iijima | ........................... | 359/689 |
| 7,589,906 B2 * | 9/2009 | Ito | ................................. | 359/682 |
| 7,738,183 B2 * | 6/2010 | Ito | ................................. | 359/682 |
| 7,742,236 B2 * | 6/2010 | Ohata | .......................... | 359/682 |
| 7,773,311 B2 * | 8/2010 | Endo | ............................. | 359/686 |
| 2008/0043341 A1 * | 2/2008 | Ori | ................................ | 359/682 |
| 2008/0198463 A1 | 8/2008 | Muratani | | |
| 2009/0257130 A1 * | 10/2009 | Iwama | ......................... | 359/682 |
| 2010/0238560 A1 * | 9/2010 | Fujimoto | ..................... | 359/682 |
| 2010/0254023 A1 * | 10/2010 | Ito | ................................. | 359/682 |
| 2010/0265594 A1 * | 10/2010 | Matsui et al. | ................. | 359/682 |
| 2011/0026131 A1 * | 2/2011 | Ito | ................................. | 359/682 |

FOREIGN PATENT DOCUMENTS

JP    2008-203344    9/2008

OTHER PUBLICATIONS

U.S. Appl. No. 13/306,070 to Tetsuya Abe et al., filed Nov. 29, 2011.

* cited by examiner

*Primary Examiner* — Evelyn A. Lester
(74) *Attorney, Agent, or Firm* — Greenblum & Bernstein P.L.C.

(57) ABSTRACT

A zoom lens system includes a negative first lens group, a positive second lens group, and a positive third lens group, in that order from the object side, wherein upon zooming from the short focal length extremity to the long focal length extremity, the distance between the first lens group and the second lens group decreases, and the distance between the second lens group and the third lens group increases. The second lens group includes a positive first sub-lens group and a negative second sub-lens group, in that order from the object side. The second sub-lens group is a negative single lens element serving as an image-stabilizer lens group which moves in directions orthogonal to the optical axis to change the imaging position to correct image shake.

11 Claims, 17 Drawing Sheets

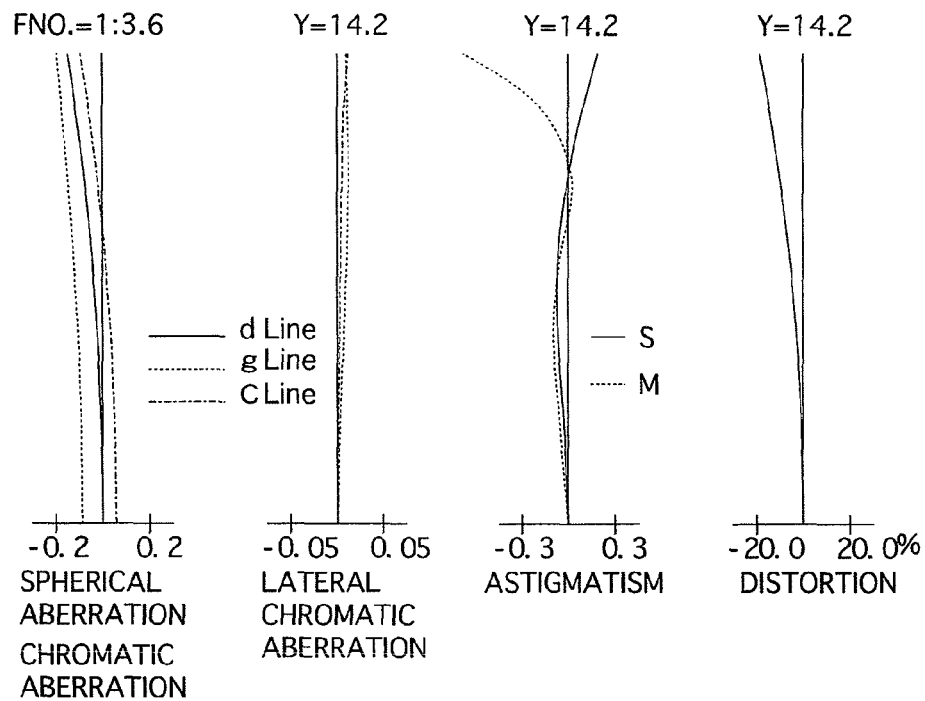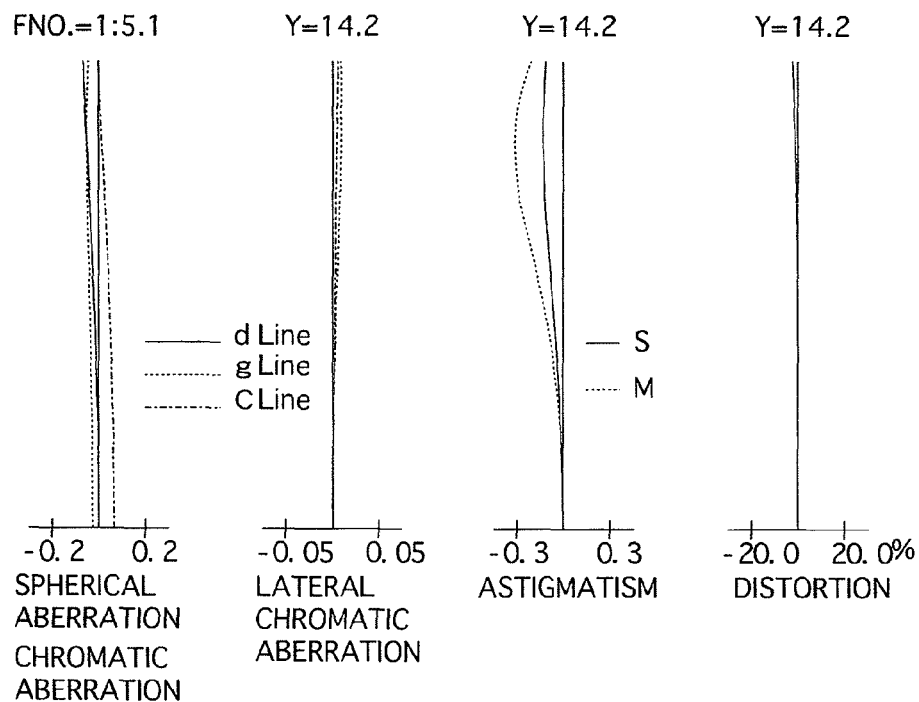

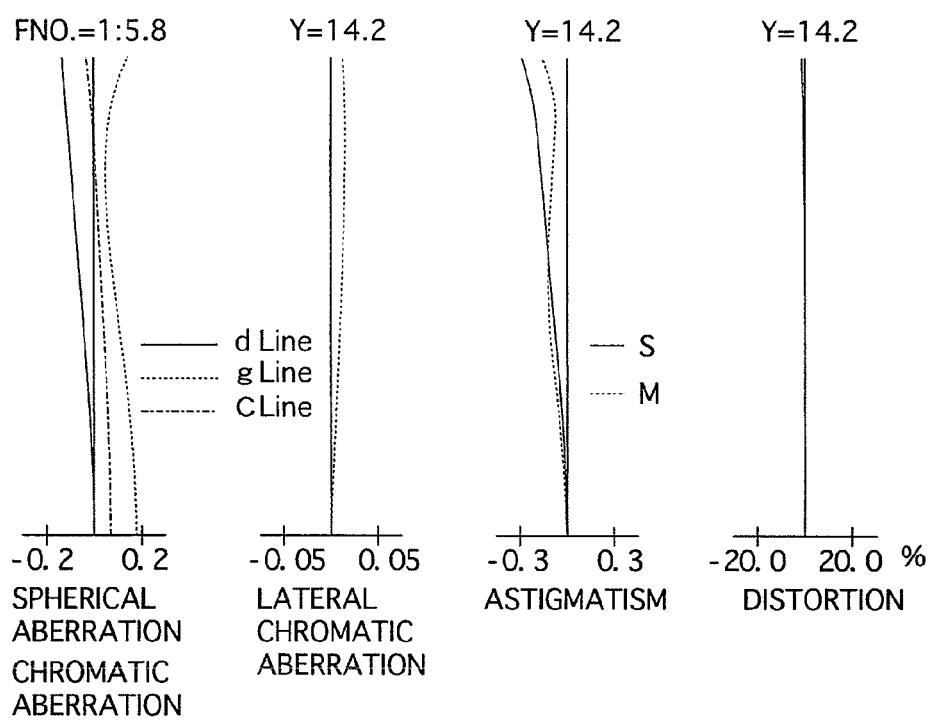

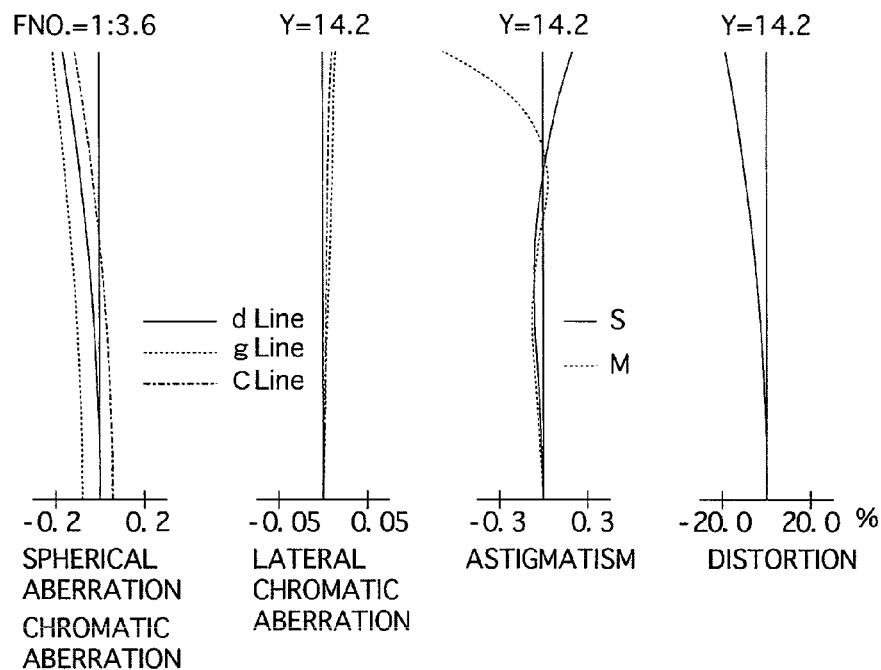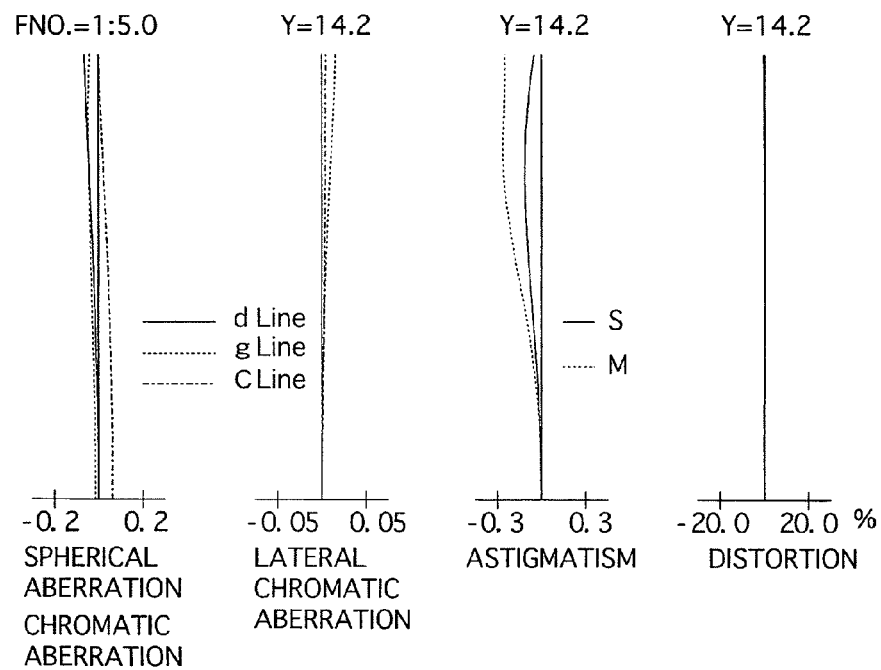

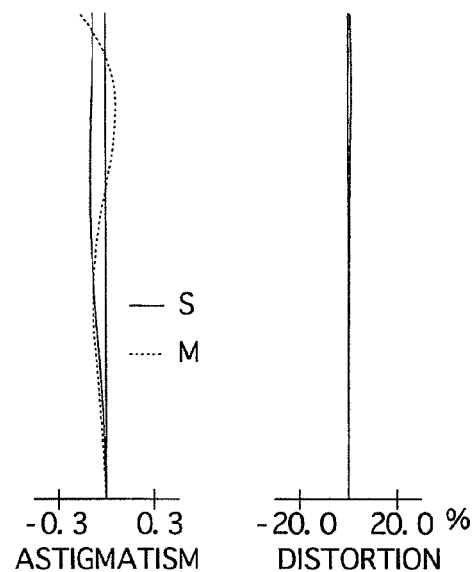

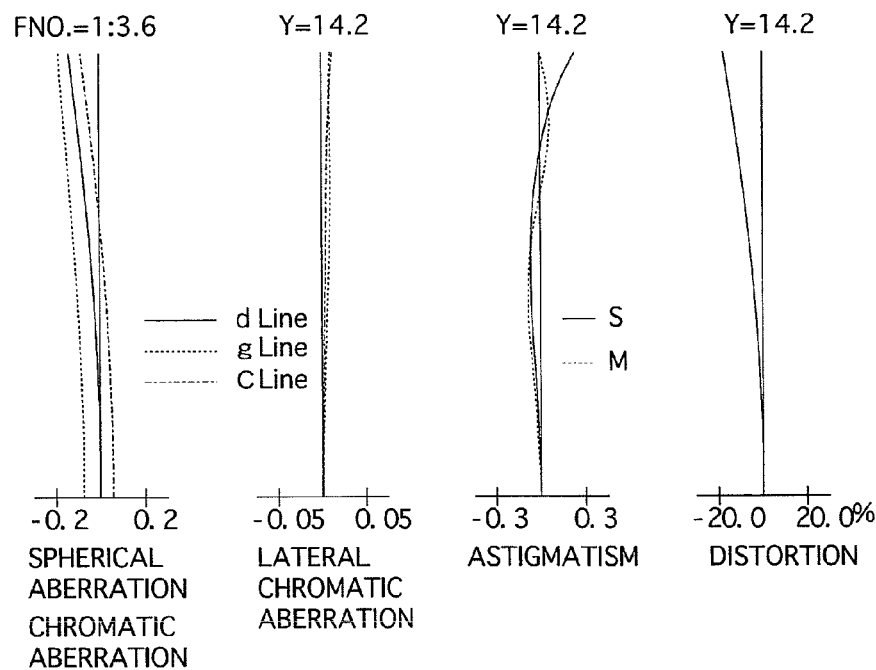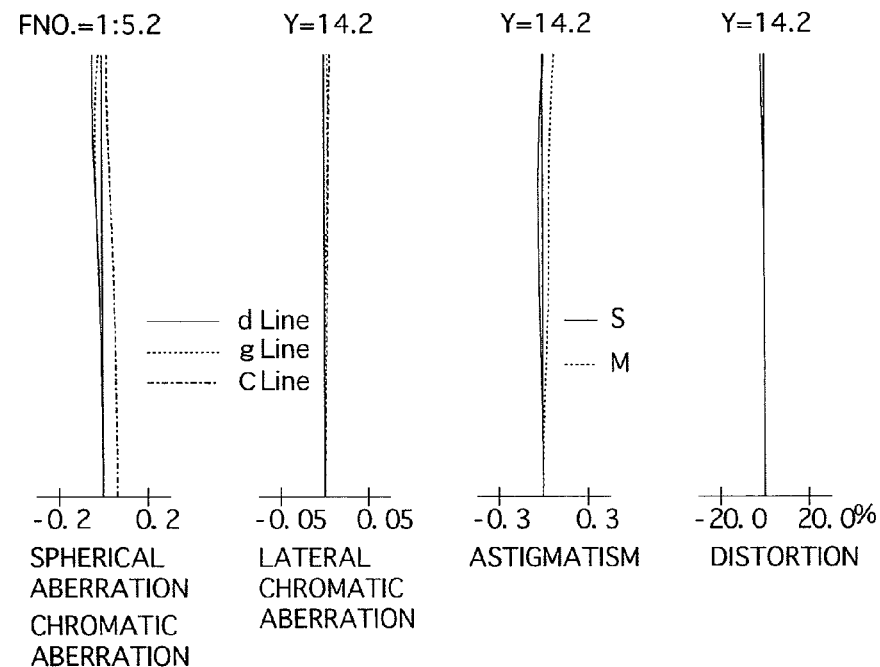

FNO.=1:5.8
-0.2  0.2
SPHERICAL
ABERRATION
CHROMATIC
ABERRATION

— d Line
······ g Line
------ C Line

Y=14.2
-0.05  0.05
LATERAL
CHROMATIC
ABERRATION

Y=14.2
— S
----- M
-0.3  0.3
ASTIGMATISM

Y=14.2
-20.0  20.0 %
DISTORTION

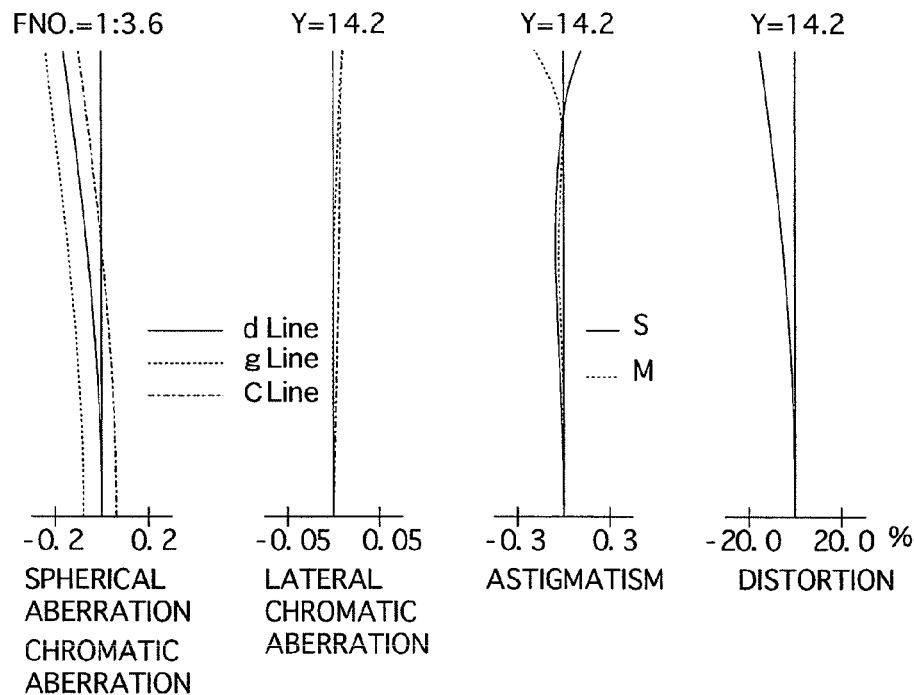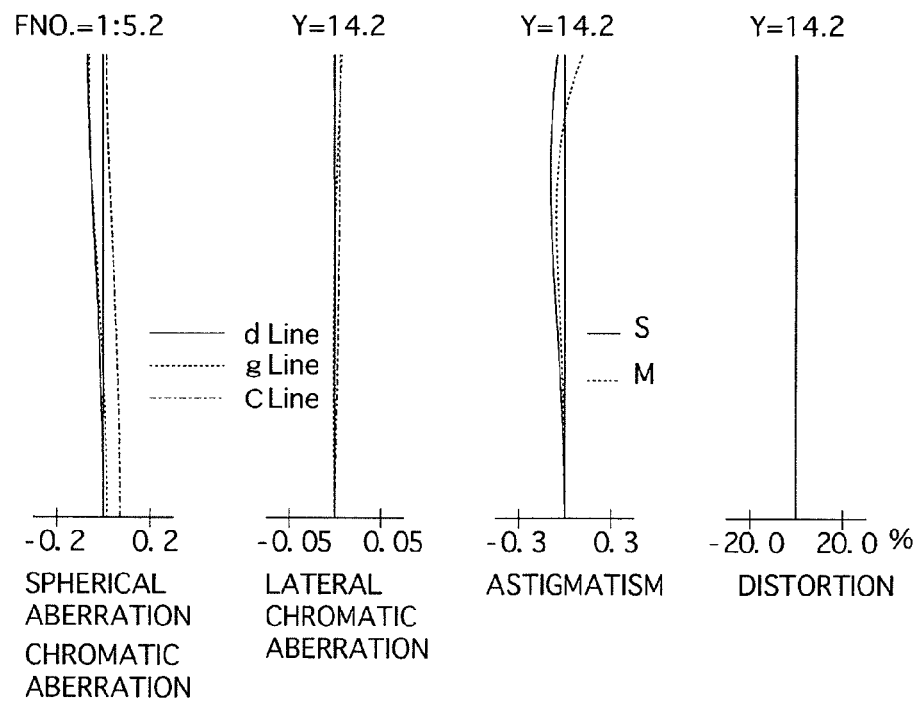

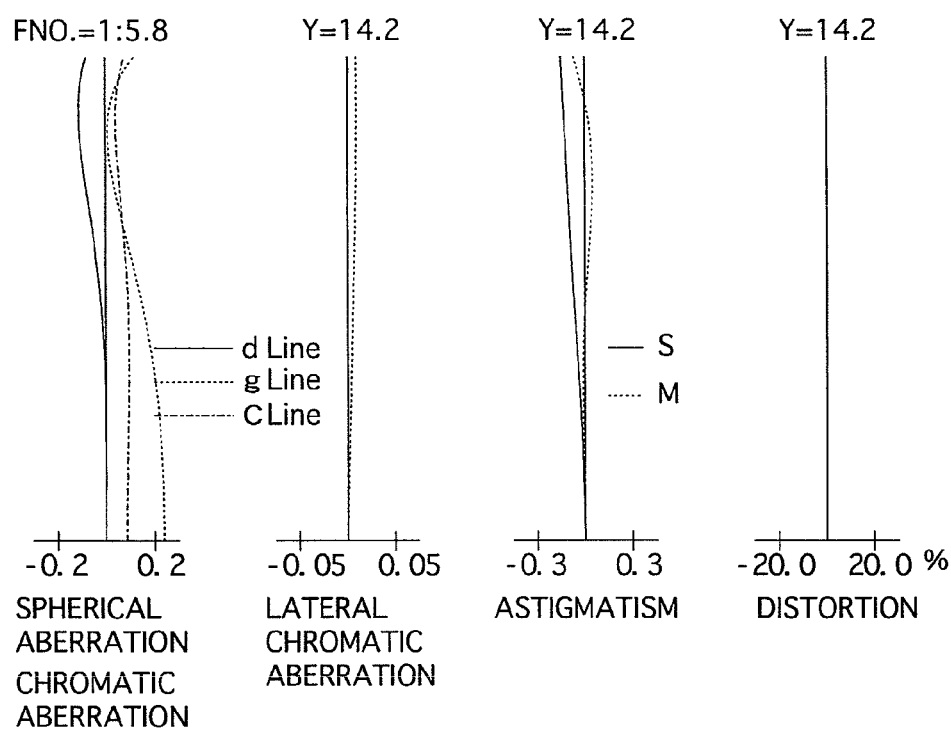

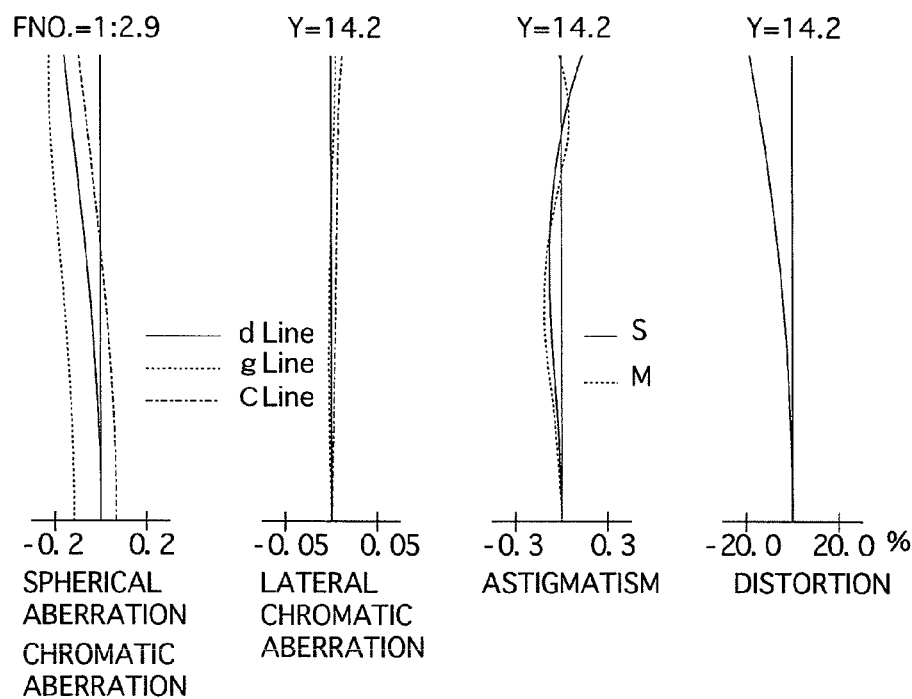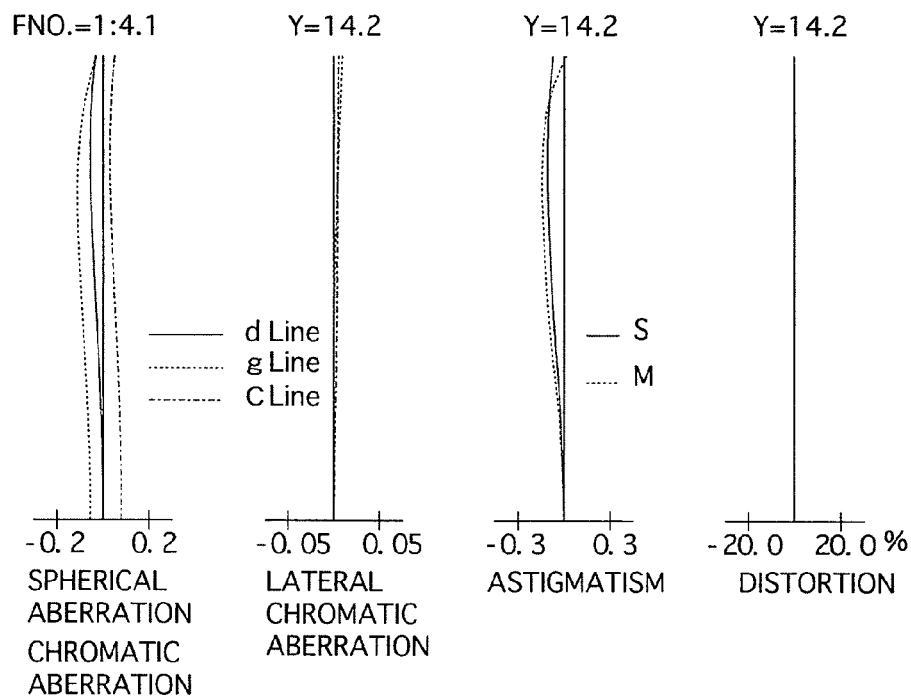

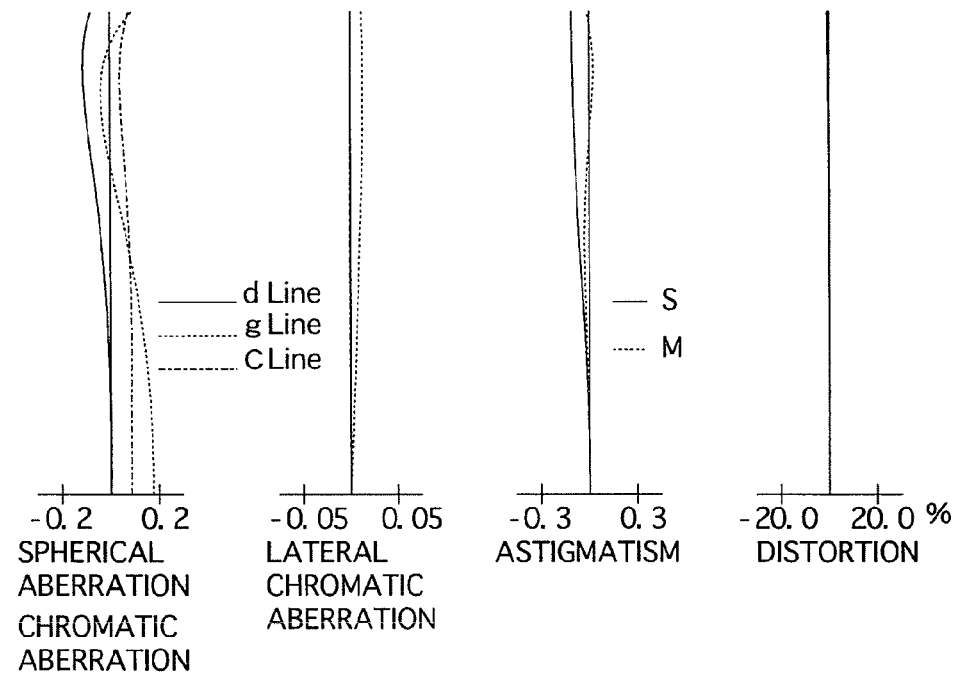

ZOOM LENS SYSTEM

BACKGROUND OF THE INVENTION

1. Field of the Invention

The present invention relates to a zoom lens system having an image-stabilizing function.

2. Description of Related Art

An image sensor used in a compact digital camera typically has a size of about 1/2.5-inch through 1/1.7-inch, in which high pixelization is achieved by miniaturizing the pixel pitch. However, in recent years, the pixel pitch has been reduced down to approximately 1 through 2 µm, and further improvement of the image quality cannot be expected. The use of a large image sensor which can enlarge the pixel even in a compact digital camera is known to achieve a higher quality, in the real sense. However, if the image sensor is enlarged, the optical system also increases in size to the extent that such an optical system cannot be accommodated in a compact digital camera. In particular, in a zoom lens system equipped with a so-called optical image-stabilizer (shake-correction device), in which part of the zoom lens system is driven in directions orthogonal to the optical axis in accordance with the magnitude of hand shake, etc., that is applied to the camera in order to correct image shake, when an entire lens group of one of the movable lens groups thereof, which are moved during zooming, is driven in order to correct image-shake (which is often carried out in a compact digital camera), the mechanical burden on this movable lens group is large and it is difficult to miniaturize the lens unit thereof.

Out of negative-lead zoom lens systems, in which the frontmost lens diameter thereof can be reduced, zoom lens systems having a negative lens group, a positive lens group and a positive lens group, in that order from the object side, (i.e., three lens groups) having favorable telecentricity and few backfocus restrictions are often used in compact digital cameras that do not have an interchangeable lens barrel. In such a type of zoom lens system, it is very common for the third lens group which is provided close to the camera body (and is easily driven) to perform a focusing operation to serve as a focusing lens group, and for the entire second lens group that has a relatively (compared to the first lens group and the third lens group) small diameter to serve as a image-stabilizer lens group (shake-correction lens group). However, if the size of the image sensor is increased, since the entire zoom lens system is enlarged accordingly, although the outer diameter of the zoom lens system may be small, if the entire second lens group is utilized to serve as a image-stabilizer lens group, the mechanical burden is increased.

Furthermore, Japanese Unexamined Patent Publication No. 2008-203344 discloses a zoom lens system having a negative lens group and a positive lens group, in that order from the object side (i.e., two lens groups), in which the entire second lens group serves as an image-stabilizer lens group. However, since this second lens group serving as an image-stabilizer lens group is configured of three lens elements, there is an increased burden on the driving device therefor.

SUMMARY OF THE INVENTION

The present invention has been devised in view of the above-described problems, and provides a zoom lens system which achieves miniaturization and weight-reduction of the image-shake correction lens group (image-stabilizer lens group), has minimal deterioration in the imaging quality during image-shake correction (image-stabilization), is capable of wide-angle high-zoom ratio zooming and is compatible with a large image sensor.

According to an aspect of the present invention, a zoom lens system is provided, including a negative first lens group, a positive second lens group, and a positive third lens group, in that order from the object side, wherein upon zooming from the short focal length extremity to the long focal length extremity, the distance between the first lens group and the second lens group decreases, and the distance between the second lens group and the third lens group increases. The second lens group includes a positive first sub-lens group and a negative second sub-lens group, in that order from the object side. The second sub-lens group includes a negative single lens element which serves as an image-stabilizer lens group which is moved in a direction orthogonal to the optical axis to change the imaging position of the zoom lens system in order to correct image shake.

It is desirable for the following condition (1) to be satisfied:

$$-1.5 < F2/F2B < -0.7 \qquad (1),$$

wherein F2 designates the focal length of the second lens group, and F2B designates the focal length of the negative single lens element of the second sub-lens group.

It is desirable for the following condition (2) to be satisfied:

$$-3 < (1-M2BT)*M3T < -1.5 \qquad (2),$$

wherein M2BT designates the lateral magnification of the negative single lens element of the second sub-lens group when focused on an object at infinity at the long focal length extremity, and M3T designates the lateral magnification of the third lens group when focused on an object at infinity at the long focal length extremity.

It is desirable for the following condition (3) to be satisfied:

$$\nu 2B > 45 \qquad (3),$$

wherein ν2B designates the Abbe number with respect to the d-line of the negative single lens element of the second sub-lens group.

It is desirable for the negative single lens element of the second sub-lens group to include a focusing lens group which is moved along the optical axis direction during a focusing operation, and wherein the following condition (4) is satisfied:

$$T2B/T2 < 0.1 \qquad (4),$$

wherein T2B designates the distance along the optical axis from the surface of the negative single lens element of the second sub-lens group that is closest to the object side to the surface of the negative single lens element of the second sub-lens group that is closest to the image side, and T2 designates the distance along the optical axis from the surface of the second lens group that is closest to the object side to the surface of the second lens group that is closest to the image side.

In an embodiment, a zoom lens system is provided, including a negative first lens group, a positive second lens group, and a positive third lens group, in that order from the object side, wherein upon zooming from the short focal length extremity to the long focal length extremity, the distance between the first lens group and the second lens group decreases, and the distance between the second lens group and the third lens group increases. The second lens group includes a positive first sub-lens group and a negative second sub-lens group, in that order from the object side. The second sub-lens group serves both as an image-stabilizer lens group that corrects image shake by moving in a directions orthogonal to the optical axis to change the imaging position, and as a focusing lens group which moves in the optical axis direction during a focusing operation.

The second sub-lens group can be configured of a negative single lens element.

It is desirable for the following condition (5) to be satisfied:

$$0<(RA+RB)/(RA-RB)<3 \qquad (5),$$

wherein RA designates the radius of curvature of the surface on the object side of the negative single lens element of the second sub-lens group, and RB designates the radius of curvature of the surface on the image side of the negative single lens element of the second sub-lens group.

It is desirable for the following condition (6) to be satisfied:

$$1.05<M3T/M3W<1.35 \qquad (6),$$

wherein M3T designates the lateral magnification of the third lens group when focused on an object at infinity at the long focal length extremity, and M3W designates the lateral magnification of the third lens group when focused on an object at infinity at the short focal length extremity.

It is desirable for the first sub-lens group of the second lens group to include a positive lens element, a positive lens element, a negative lens element, and a positive lens element, in that order from the object side.

It is desirable for the first lens group to include a negative lens element, a negative lens element having an aspherical surface on at least one side thereof, and a positive lens element, in that order from the object side. The following condition (7) is satisfied:

$$0<F1/FA<0.4 \qquad (7),$$

wherein F1 designates the focal length of the first lens group, and FA designates the focal length of the negative lens element having an aspherical surface on at least one side thereof.

According to the present invention, a zoom lens system is provided which achieves miniaturization and weight-reduction of the image-shake correction lens group (image-stabilizer lens group), has minimal deterioration in the imaging quality during image-shake correction (image-stabilization), is capable of wide-angle high-zoom ratio zooming and is compatible with a large image sensor.

The present disclosure relates to subject matter contained in Japanese Patent Application No. 2011-53702 (filed on Mar. 11, 2011) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement of FIG. 1, at the short focal length extremity;

FIGS. 3A, 3B, 3C and 3D show various aberrations that occurred in the lens arrangement of FIG. 1, at an intermediate focal length;

FIGS. 4A, 4B, 4C and 4D show various aberrations that occurred in the lens arrangement of FIG. 1, at the long focal length extremity;

FIGS. 6A, 6B, 6C and 6D show various aberrations that occurred in the lens arrangement of FIG. 5, at the short focal length extremity;

FIGS. 7A, 7B, 7C and 7D show various aberrations that occurred in the lens arrangement of FIG. 5, at an intermediate focal length;

FIGS. 8A, 8B, 8C and 8D show various aberrations that occurred in the lens arrangement of FIG. 5, at the long focal length extremity;

FIGS. 10A, 10B, 10C and 10D show various aberrations that occurred in the lens arrangement of FIG. 9, at the short focal length extremity;

FIGS. 11A, 11B, 11C and 11D show various aberrations that occurred in the lens arrangement of FIG. 9, at an intermediate focal length;

FIGS. 14A, 14B, 14C and 14D show various aberrations that occurred in the lens arrangement of FIG. 13, at the short focal length extremity;

FIGS. 15A, 15B, 15C and 15D show various aberrations that occurred in the lens arrangement of FIG. 13, at an intermediate focal length;

FIGS. 16A, 16B, 16C and 16D show various aberrations that occurred in the lens arrangement of FIG. 13, at the long focal length extremity;

FIGS. 18A, 18B, 18C and 18D show various aberrations that occurred in the lens arrangement of FIG. 17 at the short focal length extremity;

FIGS. 19A, 19B, 19C and 19D show various aberrations that occurred in the lens arrangement of FIG. 17, at an intermediate focal length;

FIGS. 20A, 20B, 20C and 20D show various aberrations that occurred in the lens arrangement of FIG. 17, at the long focal length extremity;

DESCRIPTION OF THE EMBODIMENTS

Figure 21:
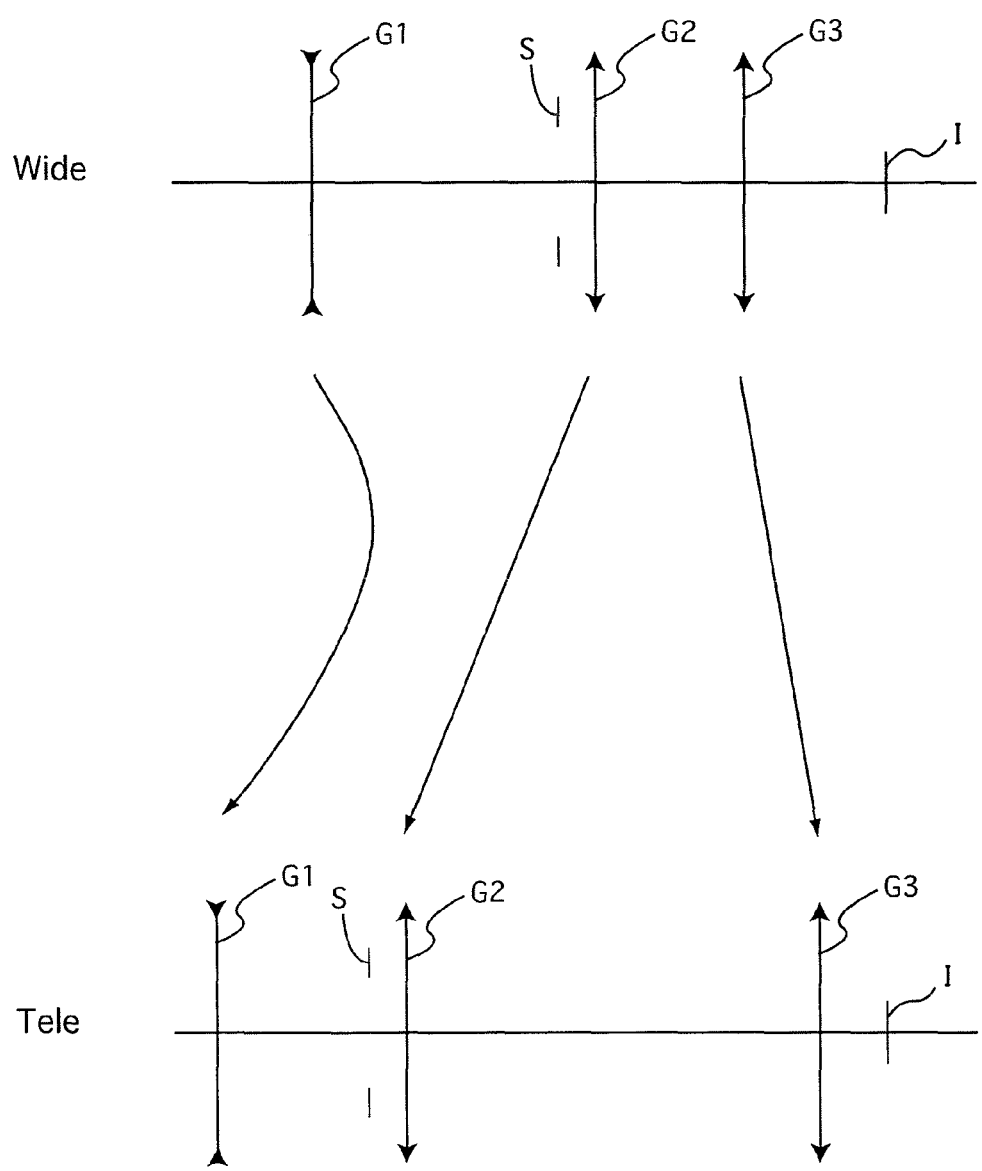
FIG. 21 shows a first zoom path of the zoom lens system according to the present invention.

The zoom lens system in the first and third through fifth numerical embodiments of the present invention, as shown in the zoom path of FIG. 21, is configured of a negative first lens group G1, a positive second lens group G2, and a positive third lens group G3, in that order from the object side. A diaphragm S which is disposed in between the first lens group G1 and the second lens group G2 moves integrally with the second lens group G2 during zooming. 'I' designates the imaging plane.

Upon zooming from the short focal length extremity (WIDE) to the long focal length extremity (TELE), each of the first through third lens groups G1 through G3 are moved along the optical axis direction so that the distance between the first lens group G1 and the second lens group G2 decreases, and the distance between the second lens group G2 and the third lens group G3 increases.

More specifically, upon zooming from the short focal length extremity to the long focal length extremity, the first lens group G1 first moves toward the image side and thereafter moves toward the object side past the short focal length extremity position (so as to move toward the object side overall), the second lens group G2 moves monotonically toward the object side, and the third lens group G3 moves monotonically toward the image side.

Figure 22:
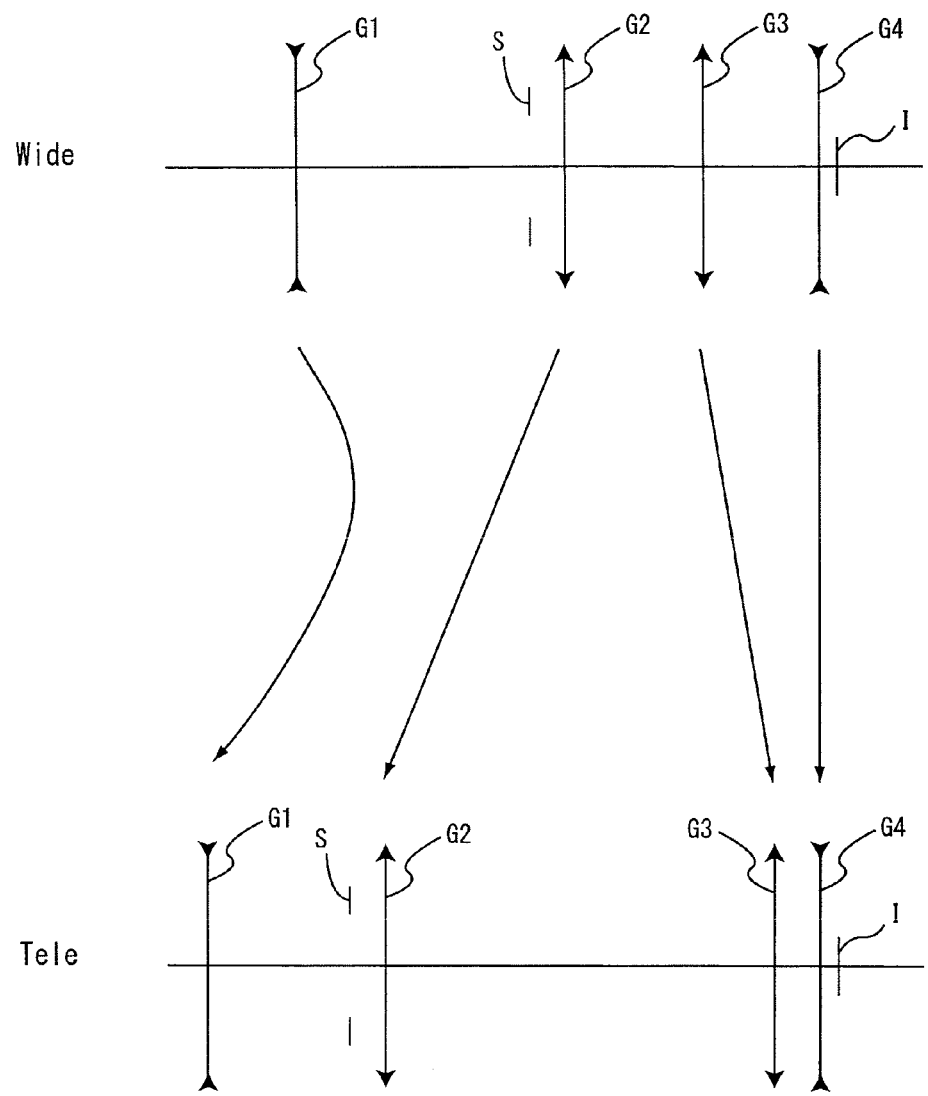
FIG. 22 shows a second zoom path of the zoom lens system according to the present invention.

The zoom lens system in the second numerical embodiment of the present invention, as shown in the zoom path of FIG. 22, is configured of a negative first lens group G1, a positive second lens group G2, a positive third lens group G3 and a negative fourth lens group G4, in that order from the object side. A diaphragm S which is disposed in between the first lens group G1 and the second lens group G2 moves integrally with the second lens group G2 during zooming. 'I' designates the imaging plane.

Upon zooming from the short focal length extremity (WIDE) to the long focal length extremity (TELE), each of the first through third lens groups G1 through G3 are moved along the optical axis direction so that the distance between the first lens group G1 and the second lens group G2 decreases, the distance between the second lens group G2 and the third lens group G3 increases, and the distance between the third lens group G3 and the fourth lens group G4 decreases.

More specifically, upon zooming from the short focal length extremity to the long focal length extremity, the first lens group G1 first moves toward the image side and thereafter moves toward the object side past the short focal length extremity position (so as to move to the object side overall), the second lens group G2 moves monotonically toward the object side, the third lens group G3 moves monotonically toward the image side, and the fourth lens group G4 does not move in the optical axis direction (remains stationary with respect to the distance from the imaging plane I).

In each of the first through fifth numerical embodiments, the first lens group G1 is configured of a negative lens element 11, a negative lens element 12, and a positive lens element 13, in that order from the object side. The negative lens element 12 is provided with an aspherical surface on each side.

In each of the first through fifth numerical embodiments, the second lens group G2 is configured of a positive first sub-lens group G2A and a negative second sub-lens group G2B, in that order from the object side.

The first sub-lens group G2A is configured of a positive lens element 21, a cemented lens having a positive lens element 22 and a negative lens element 23; and a positive lens element 24, in that order from the object side. The positive lens element 21 has an aspherical surface on each side thereof.

The second sub-lens group G2B is configured of a negative single lens element 25. The second sub-lens group G2B (negative single lens element 25) constitutes an image-shake correction lens group (image-stabilizer lens group) which corrects image shake by moving in directions orthogonal to the optical axis direction to change the imaging position.

The third lens group G3 is configured of a single positive lens element 31. The positive lens element 31 has an aspherical surface on each side thereof.

The second sub-lens group G2B (negative single lens element 25) and the third lens group G3 (single positive lens element 31) constitute a focusing lens group that is moved during a focusing operation. More specifically, upon focusing on an object at infinity to an object at a finite distance at a desired zooming range, focusing is performed by one of the following operations (A) or (B).

(A) Focusing is performed by moving only the third lens group G3 (positive single lens element 31) toward the object side.

(B) Focusing is performed by moving the second sub-lens group G2B toward the object side or the image side and moving the third lens group G3 (positive single lens element 31) toward the object side.

The second sub-lens group G2B (negative single lens element 25) serves both as an image-stabilizer lens group that corrects image shake by moving in a directions orthogonal to the optical axis to change the imaging position, and as a focusing lens group which moves in the optical axis direction during a focusing operation.

According to the zoom lens system of the present invention, the second lens group G2, which is moved during zooming, is divided into two lens groups, namely, the positive first sub-lens group G2A and the negative second sub-lens group G2B. The negative second sub-lens group G2B is configured of the negative single lens element 25 having a smaller outer diameter (compared to the first sub-lens group G2A). Furthermore, in the illustrated embodiment, this negative single lens element 25 that constitutes the second sub-lens group G2B serves as an image-shake correction lens group (image-stabilizer lens group) that corrects image shake by moving in directions orthogonal to the optical axis to change the imaging position. Accordingly, compared to the case where the entire second lens group G2 serves as an image-shake correction lens group (image-stabilizer lens group), the image-shake correction lens group can be reduced in weight and made thinner (smaller in the optical axis direction), and the load on the image-stabilizer driving mechanism can be greatly reduced, so that the image-stabilizer driving mechanism can be reduced in size resulting in miniaturization of the entire zoom lens system.

Condition (1) specifies the ratio of the focal length of the second lens group G2 to the focal length of the negative single lens element 25 that constitutes the image-shake correction lens group. By satisfying condition (1), the image-stabilizer driving mechanism can be reduced in size so that the entire zoom lens system can be miniaturized, and deterioration of imaging quality during image-shake correction (image-stabilization) can be suppressed.

If the upper limit of condition (1) is exceeded, the refractive power of the negative single lens element 25 that constitutes the image-shake correction lens group becomes too weak, so that the driving amount of the image-stabilizer driving mechanism increases, increasing the size of the entire zoom lens system which includes the image-stabilizer driving mechanism.

If the lower limit of condition (1) is exceeded, the refractive power of the negative single lens element 25 (image-shake correction lens group) becomes too strong, so that the imaging quality during image-shake correction deteriorates.

Condition (2) specifies the image-stabilizing sensitivity of the negative single lens element 25 (image-shake correction lens group) at the long focal length extremity. By satisfying condition (2), the image-stabilizer driving mechanism can be reduced in size so that the entire zoom lens system can be miniaturized while simplifying the assembly process, thereby reducing costs.

If the upper limit of condition (2) is exceeded, the image-stabilizing sensitivity of the negative single lens element 25 (image-shake correction lens group) becomes too low, resulting in an increased image-stabilizer driving amount in order to attain the required image-shake correction amount, and therefore increasing the size of the entire zoom lens system which includes the image-stabilizer driving mechanism.

If the lower limit of condition (2) is exceeded, the image-stabilizing sensitivity of the negative single lens element 25 (image-shake correction lens group) becomes too high, so that the mechanical positioning of the negative single lens element 25 needs to be carried out with high precision, making the assembly process difficult and increasing costs.

Condition (3) specifies the Abbe number with respect to the d-line of the negative single lens element 25 (image-shake correction lens group). By satisfying condition (3), lateral chromatic aberration fluctuations occurring during image-shake correction and fluctuations of chromatic aberration upon zooming from the short focal length extremity to the long focal length extremity can be decreased, thereby suppressing deterioration of the optical quality.

If the lower limit of condition (3) is exceeded, lateral chromatic aberration fluctuations occurring during image-shake correction and fluctuations of chromatic aberration during zooming increase, deteriorating the optical quality.

As described above, as shown in each of the first through fifth numerical embodiments, in the zoom lens system of the present invention, the negative single lens element 25 (image-shake correction lens group) serves as a focusing lens group which is moved along the optical axis during a focusing operation.

With such an arrangement, condition (4) specifies the ratio of the distance from the surface on the object side to the surface on the image side of the negative single lens element 25 (i.e., the thickness of the negative single lens element 25 along the optical axis) to the distance from the surface on the object side to the surface on the image side of the second lens group G2 (i.e., the thickness of the second lens group G2 along the optical axis). By satisfying condition (4), the weight of the negative single lens element 25 (second sub-lens group G2B) which constitutes the image-shake correction lens group can be further reduced.

If the upper limit of condition (4) is exceeded, reduction in weight of the negative single lens element 25 becomes insufficient, increasing the burden on the focusing-operation drive mechanism.

In the zoom lens system according to the present invention, the second lens group G2, which is moved during zooming, is divided into two lens groups, namely, the first sub-lens group G2A and the second sub-lens group G2B, and the second sub-lens group G2B (negative single lens element 25) serves both as an image-stabilizer lens group that corrects image shake by moving in a directions orthogonal to the optical axis to change the imaging position, and as a focusing lens group which moves in the optical axis direction during a focusing operation. According to this configuration, compared to a conventional arrangement in which the image-shake correction lens group and the focusing lens group are separate lens groups, an optical unit including driving mechanisms for performing image-shake correction (image stabilization) and for performing a focusing operation can be dramatically reduced in size (miniaturized). Furthermore, by forming the second sub-lens group G2B from the negative single lens element 25, the weight of the image-shake correction lens group and the focusing lens group can be reduced.

Condition (5) specifies the shape factor (the ratio of the radius of curvature of the surface on the object side to the radius of curvature of the surface on the image side) of the negative single lens element 25 in the case where the second sub-lens group GB2, serving both as an image-shake correction lens group and a focusing lens group, is configured of the negative single lens element 25. By satisfying condition (5), fluctuation of the optical quality when focused at a close distance can be reduced.

If the upper limit of condition (5) is exceeded, the curvatures of the surface on the object side and the surface on the image side of the negative single lens element 25 become close (similar) to each other, so that the refractive power of the negative single lens element 25 becomes weak, which results in a large amount of movement of the negative single lens element 25 during a focusing operation.

If the lower limit of condition (5) is exceeded, the curvature of the surface on the object side of the negative single lens element 25, which constitutes the focusing lens group, becomes too great (i.e., the radius of curvature becomes too small), so that a large amount of aberration fluctuations occur during focusing at various object distances.

Condition (6) specifies the change in the lateral magnification of the third lens group G3 upon zooming from the short focal length extremity to the long focal length extremity. By satisfying condition (6), miniaturization of the zoom lens system and a high zoom ratio can both be achieved.

If the upper limit of condition (6) is exceeded, although advantageous in regard to achieving a high zoom ratio, the change in the lens exit angle (from the third lens group G3) during zooming increases.

If the lower limit of condition (6) is exceeded, since the zooming function of the third lens group G3 decreases, the zooming burden on the second lens group G2 increases, so that the zoom lens system cannot be sufficiently miniaturized.

As described above, as shown in each of the first through fifth numerical embodiments, in the zoom lens system of the present invention, the first sub-lens group G2A is configured of four lens elements, i.e., a positive lens element 21, a positive lens element 22, a negative lens element 23 and a positive lens element 24, in that order from the object side. Accordingly, in a negative-lead lens system like that of the present invention, abaxial coma flare can be reduced over the entire zooming range.

As described above, in each of the first through fifth numerical embodiments of the zoom lens system according to the present invention, the first lens group G1 is configured of three lens elements, i.e., a negative lens element 11, a negative lens element 12 having a weak refractive power and an aspherical surface on each side thereof, and a positive lens element 13. The negative lens element 12 can alternatively only have one aspherical surface. Accordingly, by providing the lens element 12, having at least one aspherical surface, within the first lens group G1, the angle-of-view can be widened, the aperture diameter can be enlarged, and astigmatism and distortion at the short focal length extremity can be reduced.

Condition (7) specifies the ratio of the focal length of the first lens group G1 to the focal length of the (aspherical) lens element 12 that is provided in the first lens group G1, in the case where the first lens group G1 is configured of the negative lens element 11, the negative lens element 12 having an aspherical surface on at least one side thereof, and a positive lens element 13, in that order from the object side. By satisfying condition (7), a zoom lens system that exhibits minimal deterioration in optical quality during temperature changes can be achieved at a low cost.

If the upper limit of condition (7) is exceeded, undesirable changes in the imaging quality increase upon a change in temperature in the case where the lens element 12 is formed from a plastic lens material.

If the lower limit of condition (7) is exceeded, since the lens element 12 acquires a positive refractive power, the negative refractive power of the negative lens element 11 needs to become excessively strong, so that a large amount of aberrations at the abaxial light rays occur, especially at the short focal length extremity.

Specific numerical embodiments will be herein discussed. In the aberration diagrams and the tables, the d-line, g-line and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The units for the various lengths defined herein are in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

[Numerical Embodiment 1]

Figure 1:
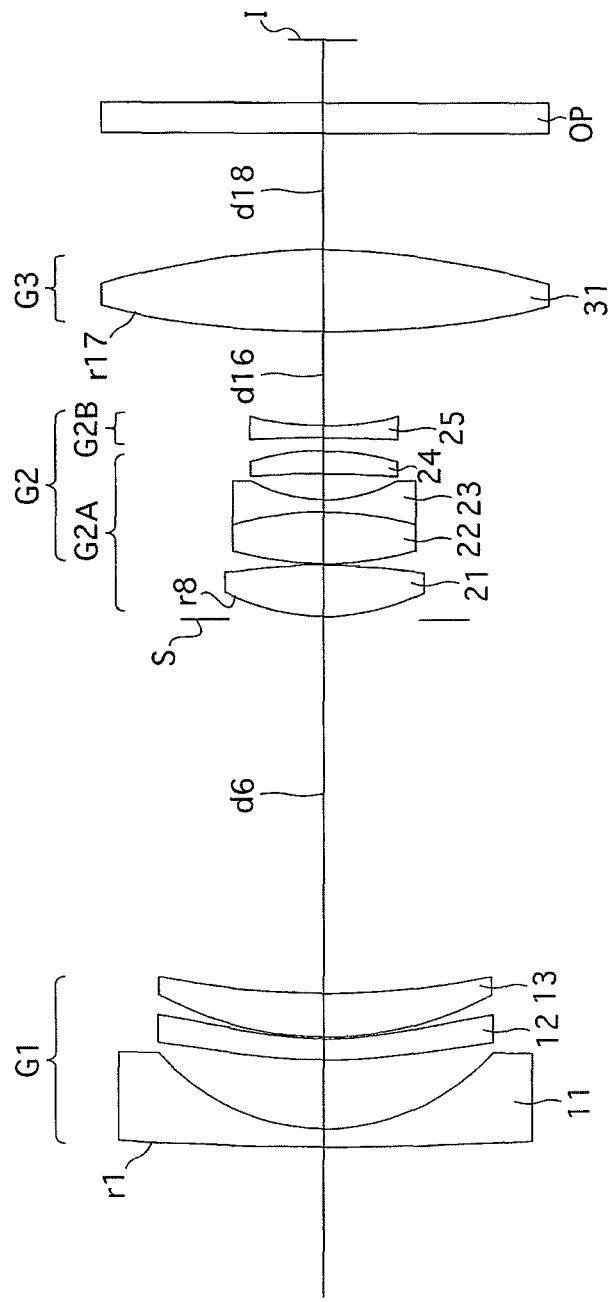
FIG. 1 shows a lens arrangement of a first numerical embodiment of a zoom lens system, according to the present invention, at the short focal length extremity when focused on an object at infinity.

FIGS. 1 through 4D and Tables 1 through 4 show a first numerical embodiment according to the present invention. FIG. 1 shows a lens arrangement of the first numerical embodiment when focused on an object at infinity at the short focal length extremity. FIGS. 2A, 2B, 2C and 2D show various aberrations that occurred in the lens arrangement shown in FIG. 1 at the short focal length extremity when focused on an object at infinity. FIGS. 3A, 3B, 3C and 3D show various aberrations that occurred in the lens arrangement shown in FIG. 1 at an intermediate focal length when focused on an object at infinity. FIGS. 4A, 4B, 4C and 4D show various aberrations that occurred in the lens arrangement shown in FIG. 1 at the long focal length extremity when focused on an object at infinity. Table 1 shows the lens surface data, Table 2 shows various zoom lens system data, Table 3 shows the aspherical surface data, and Table 4 shows the lens group data of the zoom lens system according to the first numerical embodiment.

The zoom lens system of the first numerical embodiment is configured of a negative first lens group G1, a positive second lens group G2, and a positive third lens group G3, in that order from the object side. An optical filter OP is provided behind the third lens group G3 (and in front of the imaging plane I).

The first lens group G1 (surface Nos. 1 through 6) is configured of a negative meniscus lens element 11 having a convex surface on the object side, a negative meniscus lens element 12 having a convex surface on the object side, and a positive meniscus lens element 13 having a convex surface on the object side, in that order from the object side. The negative meniscus lens element 12 has an aspherical surface on each side thereof.

The second lens group G2 (surface Nos. 8 through 16) is configured of a positive first sub-lens group G2A (surface Nos. 8 through 14) and a negative second sub-lens group G2B (surface Nos. 15 and 16), in that order from the object side.

The first sub-lens group G2A is configured of a positive biconvex lens element 21, a cemented lens having a positive biconvex lens element 22 and a negative biconcave lens element 23, and a positive meniscus lens element 24 having a convex surface on the image side, in that order from the object side. The positive biconvex lens element 21 has an aspherical surface on each side thereof.

The second sub-lens group G2B is configured of a single negative biconcave lens element 25. The single negative biconcave lens element 25 that constitutes the second sub-lens group G2B serves as a image-shake correction lens group (image-stabilizer lens group) that corrects image-shake by moving in a direction orthogonal to the optical axis direction to change the imaging position (driving the image-stabilizer mechanism).

The diaphragm S (surface No. 7), which is disposed in between the first lens group G1 and the second lens group G2, moves integrally with the second lens group G2 during zooming.

The third lens group G3 (surface Nos. 17 and 18) is configured of a single positive biconvex lens element 31. The positive biconvex lens element 31 has an aspherical surface on each side.

The optical filter OP (surface Nos. 19 and 20) which is provided behind third lens group G3 (the positive biconvex lens element 31) (and in front of the imaging plane I) is a flat parallel plate which replaces, and is optically equivalent to, a filter group having a low-pass filter and an infrared cut filter, etc., and the cover glass of the image sensor (not shown).

The second sub-lens group G2B (biconcave negative lens element 25) and the third lens group G3 (biconvex positive lens element 31) constitute a focusing lens group that is moved during a focusing operation. More specifically, upon focusing on an object at infinity to an object at a finite distance at a desired zooming range, focusing is performed by one of the following operations (A) or (B).

(A) Focusing is performed by moving only the third lens group G3 (biconvex single lens element 31) toward the object side.

(B) Focusing is performed by moving the second sub-lens group G2B (biconcave negative lens element 25) toward the object side or the image side and moving the third lens group G3 (biconvex single lens element 31) toward the object side.

The second sub-lens group G2B (biconcave negative lens element 25) serves both as an image-stabilizer lens group that corrects image shake by moving in a directions orthogonal to the optical axis to change the imaging position, and as a focusing lens group which moves in the optical axis direction during a focusing operation.

TABLE 1

SURFACE DATA

| Surf. No. | r | d | Nd | vd |
|---|---|---|---|---|
| 1 | 225.037 | 1.200 | 1.80420 | 46.5 |
| 2 | 15.089 | 4.540 | | |

TABLE 1-continued

SURFACE DATA

| Surf. No. | r | d | Nd | vd |
|---|---|---|---|---|
| 3* | 35.777 | 1.400 | 1.54358 | 55.7 |
| 4* | 25.707 | 0.100 | | |
| 5 | 23.830 | 2.897 | 1.84666 | 23.8 |
| 6 | 56.890 | d6 | | |
| 7(Diaphragm) | ∞ | 0.200 | | |
| 8* | 14.282 | 3.400 | 1.69350 | 53.2 |
| 9* | −36.678 | 0.100 | | |
| 10 | 23.448 | 3.400 | 1.61800 | 63.4 |
| 11 | −23.448 | 0.800 | 1.67270 | 32.2 |
| 12 | 10.398 | 1.732 | | |
| 13 | −65.570 | 1.516 | 1.72916 | 54.7 |
| 14 | −17.504 | 0.867 | | |
| 15 | −113.940 | 0.800 | 1.69680 | 55.5 |
| 16 | 20.598 | d16 | | |
| 17* | 104.882 | 5.377 | 1.54358 | 55.7 |
| 18* | −38.373 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 2

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.1 | 5.8 |
| f | 16.22 | 28.95 | 53.51 |
| W | 47.1 | 26.7 | 15.0 |
| Y | 14.20 | 14.20 | 14.20 |
| fB | 4.181 | 4.181 | 4.181 |
| L | 73.23 | 72.49 | 86.00 |
| d6 | 24.748 | 10.693 | 3.022 |
| d16 | 6.268 | 21.174 | 47.468 |
| d18 | 7.703 | 6.114 | 1.000 |

TABLE 3

Aspherical Surface Data (the aspherical surface coefficients not indicated are zero (0.00)):

| Surf. No. | K | A4 | A6 | A8 |
|---|---|---|---|---|
| 3 | 0.000 | −0.6506E−04 | 0.2633E−06 | −0.6673E−09 |
| 4 | 0.000 | −0.8622E−04 | 0.3361E−06 | −0.1316E−08 |
| 8 | −1.654 | 0.2252E−04 | 0.7673E−07 | |
| 9 | 0.000 | 0.5473E−04 | −0.5955E−07 | |
| 17 | 0.000 | 0.1953E−04 | −0.5202E−07 | 0.7721E−10 |
| 18 | 0.000 | 0.3153E−04 | −0.1037E−06 | 0.1448E−09 |

TABLE 4

LENS GROUP DATA

| Lens Group | 1st Surf. | Focal Length |
|---|---|---|
| 1 | 1 | −31.43 |
| 2 | 8 | 23.87 |
| (2A | 8 | 16.372) |
| (2B | 15 | −24.974) |
| 3 | 17 | 52.38 |

[Numerical Embodiment 2]

Figure 5:
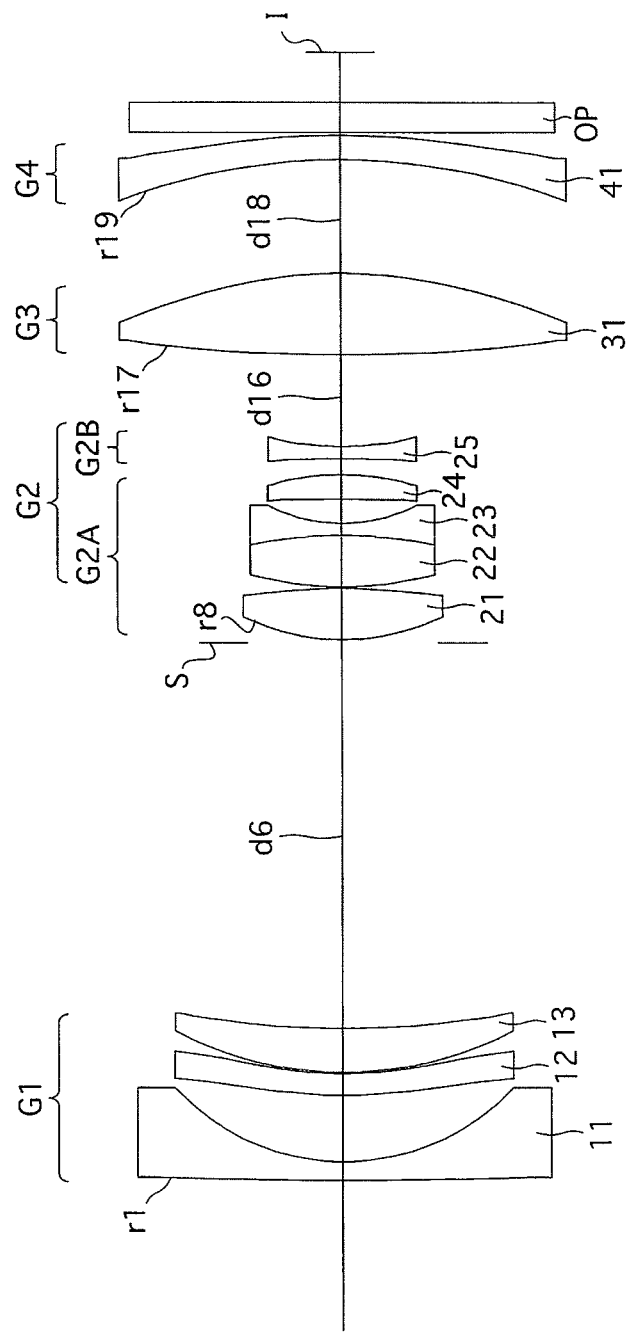
FIG. 5 shows a lens arrangement of a second numerical embodiment of a zoom lens system, according to the present invention, at the short focal length extremity when focused on an object at infinity.

FIGS. 5 through 8D and Tables 5 through 8 show a second numerical embodiment according to the present invention. FIG. 5 shows a lens arrangement of the second numerical embodiment when focused on an object at infinity at the short focal length extremity. FIGS. 6A, 6B, 6C and 6D show various aberrations that occurred in the lens arrangement shown in FIG. 5 at the short focal length extremity when focused on an object at infinity. FIGS. 7A, 7B, 7C and 7D show various aberrations that occurred in the lens arrangement shown in FIG. 5 at an intermediate focal length when focused on an object at infinity. FIGS. 8A, 8B, 8C and 8D show various aberrations that occurred in the lens arrangement shown in FIG. 5 at the long focal length extremity when focused on an object at infinity. Table 5 shows the lens surface data, Table 6 shows various zoom lens system data, Table 7 shows the aspherical surface data, and Table 8 shows the lens group data of the zoom lens system according to the second numerical embodiment.

The lens arrangement of the second numerical embodiment is the same as that of the first numerical embodiment except that a fourth lens group G4 (surface Nos. 19 and 20), which is stationary with respect to the optical axis direction, is disposed in between the third lens group G3 and the imaging plane I (i.e., the distance between the fourth lens group and the imaging plane remains constant). The fourth lens group G4 is configured of a single negative meniscus lens element 41 having a convex surface on the image side. The negative meniscus lens element 41 has an aspherical surface on the image side thereof.

TABLE 5

SURFACE DATA

| Surf. No. | r | d | Nd | vd |
|---|---|---|---|---|
| 1 | 500.000 | 1.200 | 1.80420 | 46.5 |
| 2 | 15.720 | 4.371 | | |
| 3* | 32.168 | 1.400 | 1.54358 | 55.7 |
| 4* | 24.400 | 0.100 | | |
| 5 | 24.846 | 2.908 | 1.84666 | 23.8 |
| 6 | 62.170 | d6 | | |
| 7(Diaphragm) | ∞ | 0.200 | | |
| 8* | 14.679 | 3.400 | 1.69350 | 53.2 |
| 9* | −39.498 | 0.100 | | |
| 10 | 23.683 | 3.400 | 1.61800 | 63.4 |
| 11 | −30.733 | 0.800 | 1.68893 | 31.2 |
| 12 | 11.070 | 1.604 | | |
| 13 | −131.215 | 1.618 | 1.72916 | 54.7 |
| 14 | −17.776 | 1.065 | | |
| 15 | −87.264 | 0.800 | 1.69680 | 55.5 |
| 16 | 19.468 | d16 | | |
| 17* | 178.487 | 5.357 | 1.54358 | 55.7 |
| 18* | −30.729 | d18 | | |
| 19 | −42.495 | 1.600 | 1.54358 | 55.7 |
| 20* | −53.879 | 0.200 | | |
| 21 | ∞ | 2.000 | 1.51680 | 64.2 |
| 22 | ∞ | — | | |

The asterisk (*) designates an aspherical surface which is rotationally symmetrical with respect to the optical axis.

TABLE 6

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.0 | 5.8 |
| f | 16.22 | 28.69 | 53.51 |
| W | 47.1 | 26.4 | 14.8 |
| Y | 14.20 | 14.20 | 14.20 |
| fB | 3.182 | 3.182 | 3.182 |
| L | 74.42 | 72.89 | 86.00 |
| d6 | 25.520 | 11.262 | 2.949 |

TABLE 6-continued

ZOOM LENS SYSTEM DATA
Zoom Ratio 3.30

|  | Short Focal Length Extremity | Intermediate Focal Length | Long Focal Length Extremity |
|---|---|---|---|
| d16 | 6.112 | 20.345 | 45.748 |
| d18 | 7.483 | 5.977 | 2.000 |

TABLE 7

Aspherical Surface Data (the aspherical surface coefficients not indicated are zero (0.00)):

| Surf. No. | K | A4 | A6 | A8 |
|---|---|---|---|---|
| 3 | 0.000 | −0.8077E−04 | 0.2678E−06 | −0.6677E−09 |
| 4 | 0.000 | −0.1013E−03 | 0.3274E−06 | −0.1139E−08 |
| 8 | −1.495 | 0.1843E−04 | 0.1034E−06 | |
| 9 | 0.000 | 0.5859E−04 | −0.4389E−07 | |
| 17 | 0.000 | 0.1899E−04 | −0.9932E−07 | 0.2394E−09 |
| 18 | 0.000 | 0.3258E−04 | −0.1799E−06 | 0.4226E−09 |
| 20 | 0.000 | 0.8034E−06 | 0.1338E−06 | −0.4239E−09 |

TABLE 8

LENS GROUP DATA

| Lens Group | 1st Surf. | Focal Length |
|---|---|---|
| 1 | 1 | −31.84 |
| 2 | 8 | 23.92 |
| (2A | 8 | 15.905) |
| (2B | 15 | −22.773) |
| 3 | 17 | 48.67 |
| 4 | 19 | −389.27 |

[Numerical Embodiment 3]

Figure 9:
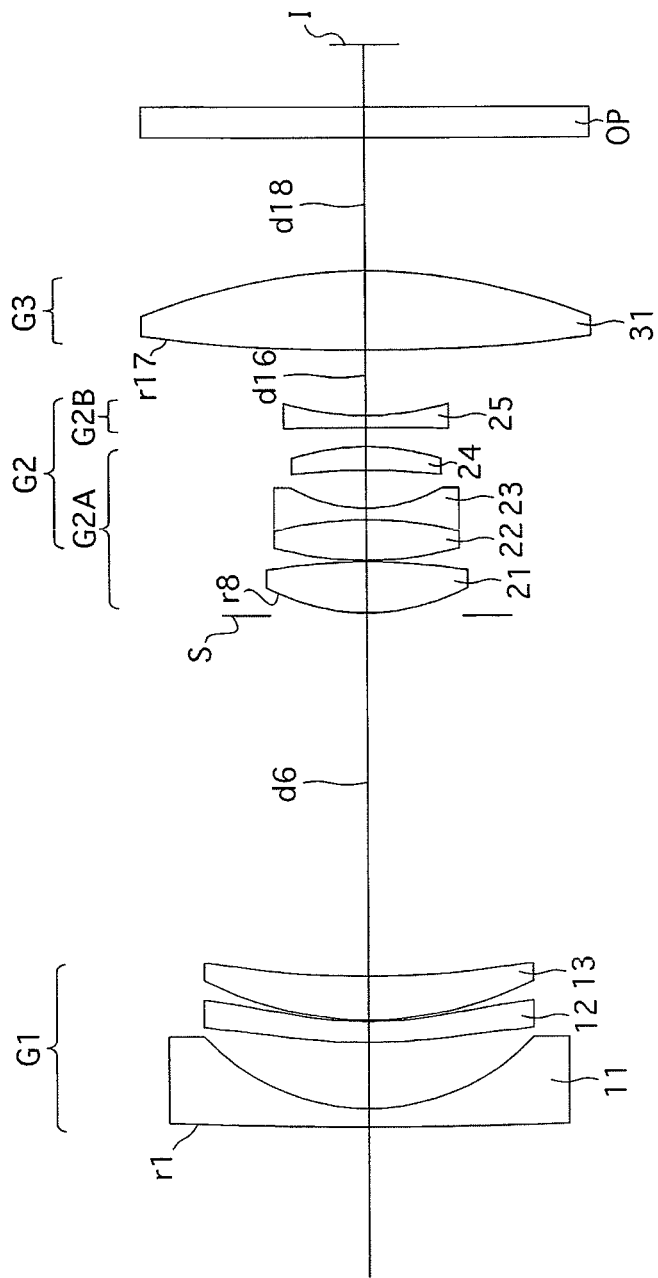
FIG. 9 shows a lens arrangement of a third numerical embodiment of a zoom lens system, according to the present invention, at the short focal length extremity when focused on an object at infinity.
Figure 12A:
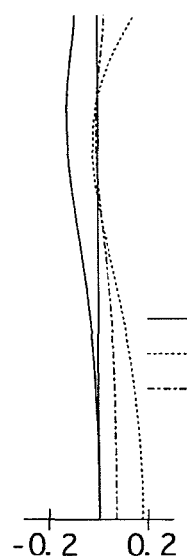
FIGS. 12A, 12B, 12C and 12D show various aberrations that occurred in the lens arrangement of FIG. 9, at the long focal length extremity.
Figure 12B:
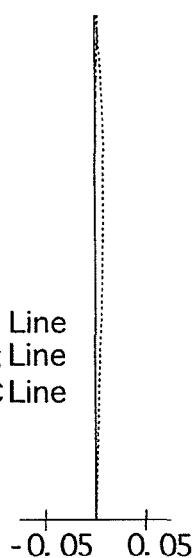
Figure 12C:
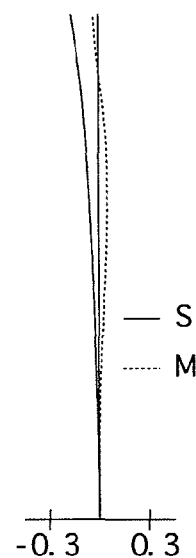
Figure 12D:
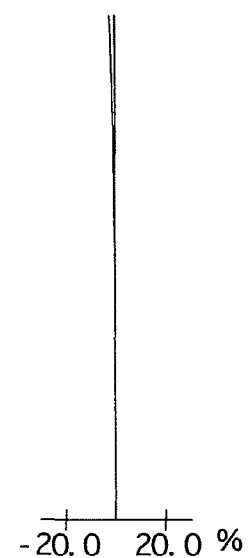

FIGS. 9 through 12D and Tables 9 through 12 show a third numerical embodiment of a zoom lens system according to the present invention. FIG. 9 shows a lens arrangement of the third numerical embodiment when focused on an object at infinity at the short focal length extremity. FIGS. 10A, 10B, 10C and 10D show various aberrations that occurred in the lens arrangement shown in FIG. 9 at the short focal length extremity when focused on an object at infinity. FIGS. 11A, 11B, 11C and 11D show various aberrations that occurred in the lens arrangement shown in FIG. 9 at an intermediate focal length when focused on an object at infinity. FIGS. 12A, 12B, 12C and 12D show various aberrations that occurred in the lens arrangement shown in FIG. 9 at the long focal length extremity when focused on an object at infinity. Table 9 shows the lens surface data, Table 10 shows various zoom lens system data, Table 11 shows the aspherical surface data, and Table 12 shows the lens group data of the zoom lens system according to the third numerical embodiment.

The lens arrangement of the third numerical embodiment is the same as that of the first numerical embodiment.

TABLE 9

SURFACE DATA

| Surf. No. | r | d | Nd | νd |
|---|---|---|---|---|
| 1 | 441.134 | 1.200 | 1.80420 | 46.5 |
| 2 | 15.334 | 4.334 | | |
| 3* | 36.506 | 1.400 | 1.54358 | 55.7 |
| 4* | 26.035 | 0.100 | | |

TABLE 9-continued

SURFACE DATA

| Surf. No. | r | d | Nd | νd |
|---|---|---|---|---|
| 5 | 24.777 | 2.877 | 1.84666 | 23.8 |
| 6 | 66.693 | d6 | | |
| 7(Diaphragm) | ∞ | 0.200 | | |
| 8* | 13.665 | 3.378 | 1.69350 | 53.2 |
| 9* | −34.783 | 0.100 | | |
| 10 | 24.201 | 2.662 | 1.61800 | 63.4 |
| 11 | −26.411 | 0.800 | 1.67270 | 32.2 |
| 12 | 10.345 | 2.500 | | |
| 13 | −42.413 | 1.569 | 1.72916 | 54.7 |
| 14 | −16.112 | 1.266 | | |
| 15 | −331.190 | 0.800 | 1.69680 | 55.5 |
| 16 | 19.092 | d16 | | |
| 17* | 184.462 | 5.243 | 1.54358 | 55.7 |
| 18* | −33.706 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 10

ZOOM LENS SYSTEM DATA
Zoom Ratio 3.30

|  | Short Focal Length Extremity | Intermediate Focal Length | Long Focal Length Extremity |
|---|---|---|---|
| FNO. | 3.6 | 5.2 | 5.8 |
| f | 16.22 | 30.00 | 53.51 |
| W | 46.7 | 25.7 | 15.2 |
| Y | 14.20 | 14.20 | 14.20 |
| fB | 4.182 | 4.182 | 4.182 |
| L | 71.60 | 72.26 | 85.00 |
| d6 | 23.826 | 9.882 | 2.812 |
| d16 | 4.338 | 21.630 | 46.579 |
| d18 | 8.823 | 6.135 | 1.000 |

TABLE 11

Aspherical Surface Data (the aspherical surface coefficients not indicated are zero (0.00)):

| Surf. No. | K | A4 | A6 | A8 |
|---|---|---|---|---|
| 3 | 0.000 | −0.8166E−04 | 0.4355E−06 | −0.1322E−08 |
| 4 | 0.000 | −0.1025E−03 | 0.4827E−06 | −0.1870E−08 |
| 8 | −2.446 | 0.7078E−04 | −0.1802E−06 | |
| 9 | 0.000 | 0.7306E−04 | −0.2240E−06 | |
| 17 | 0.000 | 0.5793E−05 | −0.9687E−09 | 0.1855E−10 |
| 18 | 0.000 | 0.1584E−04 | −0.4002E−07 | 0.7153E−10 |

TABLE 12

LENS GROUP DATA

| Lens Group | 1st Surf. | Focal Length |
|---|---|---|
| 1 | 1 | −31.39 |
| 2 | 8 | 23.80 |
| (2A | 8 | 16.789) |
| (2B | 15 | −25.882) |
| 3 | 17 | 52.87 |

[Numerical Embodiment 4]

Figure 13:
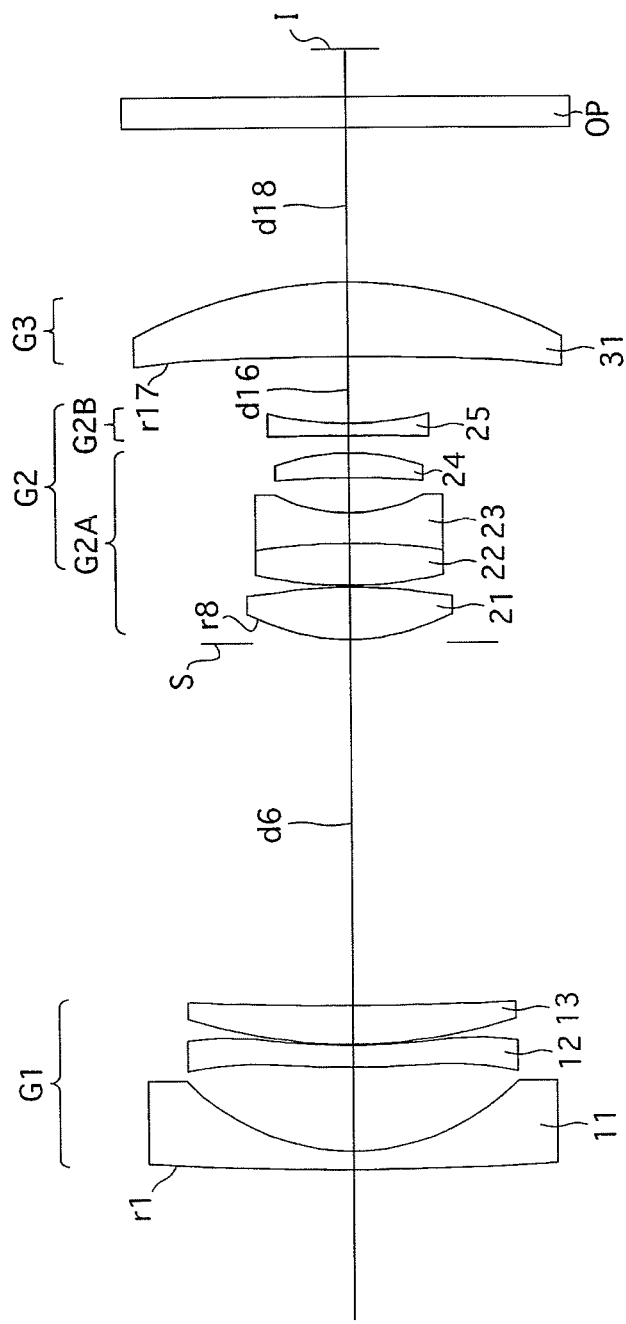
FIG. 13 shows a lens arrangement of a fourth numerical embodiment of a zoom lens system, according to the present invention, at the short focal length extremity when focused on an object at infinity.

FIGS. 13 through 16D and Tables 13 through 16 show a fourth numerical embodiment of a zoom lens system according to the present invention. FIG. 13 shows a lens arrangement of the fourth numerical embodiment when focused on an object at infinity at the short focal length extremity. FIGS.

14A, 14B, 14C and 14D show various aberrations that occurred in the lens arrangement shown in FIG. 13 at the short focal length extremity when focused on an object at infinity. FIGS. 15A, 15B, 15C and 15D show various aberrations that occurred in the lens arrangement shown in FIG. 13 at an intermediate focal length when focused on an object at infinity. FIGS. 16A, 16B, 16C and 16D show various aberrations that occurred in the lens arrangement shown in FIG. 13 at the long focal length extremity when focused on an object at infinity. Table 13 shows the lens surface data, Table 14 shows various zoom lens system data, Table 15 shows the aspherical surface data, and Table 16 shows the lens group data of the zoom lens system according to the fourth numerical embodiment.

The lens arrangement of the fourth numerical embodiment is the same as that of the first numerical embodiment except that the positive lens element 31 of the third lens group G3 is a positive meniscus lens element having a convex surface on the image side.

TABLE 13

SURFACE DATA

| Surf. No. | r | d | Nd | vd |
|---|---|---|---|---|
| 1 | 232.866 | 1.200 | 1.80420 | 46.5 |
| 2 | 15.783 | 5.522 | | |
| 3* | 55.984 | 1.400 | 1.54358 | 55.7 |
| 4* | 31.854 | 0.109 | | |
| 5 | 37.066 | 2.557 | 1.84666 | 23.8 |
| 6 | 241.925 | d6 | | |
| 7(Diaphragm) | ∞ | 0.200 | | |
| 8* | 14.361 | 3.458 | 1.69350 | 53.2 |
| 9* | −31.575 | 0.100 | | |
| 10 | 28.472 | 2.793 | 1.48749 | 70.4 |
| 11 | −42.946 | 2.000 | 1.69895 | 30.0 |
| 12 | 11.207 | 2.353 | | |
| 13 | −55.437 | 1.614 | 1.69680 | 55.5 |
| 14 | −15.296 | 1.164 | | |
| 15 | −263.247 | 0.800 | 1.72916 | 54.7 |
| 16 | 23.246 | d16 | | |
| 17* | −283.576 | 4.922 | 1.54358 | 55.7 |
| 18* | −28.643 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 14

ZOOM LENS SYSTEM DATA
Zoom Ratio 3.30

| | Short Focal Length Extremity | Intermediate Focal Length | Long Focal Length Extremity |
|---|---|---|---|
| FNO. | 3.6 | 5.2 | 5.8 |
| f | 16.22 | 29.74 | 53.51 |
| W | 46.0 | 25.4 | 14.9 |
| Y | 14.20 | 14.20 | 14.20 |
| fB | 3.181 | 3.181 | 3.181 |
| L | 73.96 | 73.72 | 85.00 |
| d6 | 24.001 | 9.960 | 2.082 |
| d16 | 4.388 | 22.117 | 46.545 |
| d18 | 10.202 | 6.266 | 1.000 |

TABLE 15

Aspherical Surface Data (the aspherical surface coefficients not indicated are zero (0.00)):

| Surf. No. | K | A4 | A6 | A8 |
|---|---|---|---|---|
| 3 | 0.000 | −0.1252E−03 | 0.4141E−06 | −0.1069E−08 |
| 4 | 0.000 | −0.1457E−03 | 0.4617E−06 | −0.1260E−08 |
| 8 | −1.456 | 0.2128E−04 | 0.7923E−07 | |
| 9 | 0.000 | 0.6995E−04 | −0.1187E−06 | |
| 17 | 0.000 | 0.1646E−05 | −0.5232E−07 | 0.4156E−10 |
| 18 | 0.000 | 0.2021E−04 | −0.8821E−07 | 0.8400E−10 |

TABLE 16

LENS GROUP DATA

| Lens Group | 1$^{st}$ Surf. | Focal Length |
|---|---|---|
| 1 | 1 | −31.03 |
| 2 | 8 | 24.01 |
| (2A | 8 | 17.744) |
| (2B | 15 | −29.260) |
| 3 | 17 | 58.22 |

[Numerical Embodiment 5]

Figure 17:
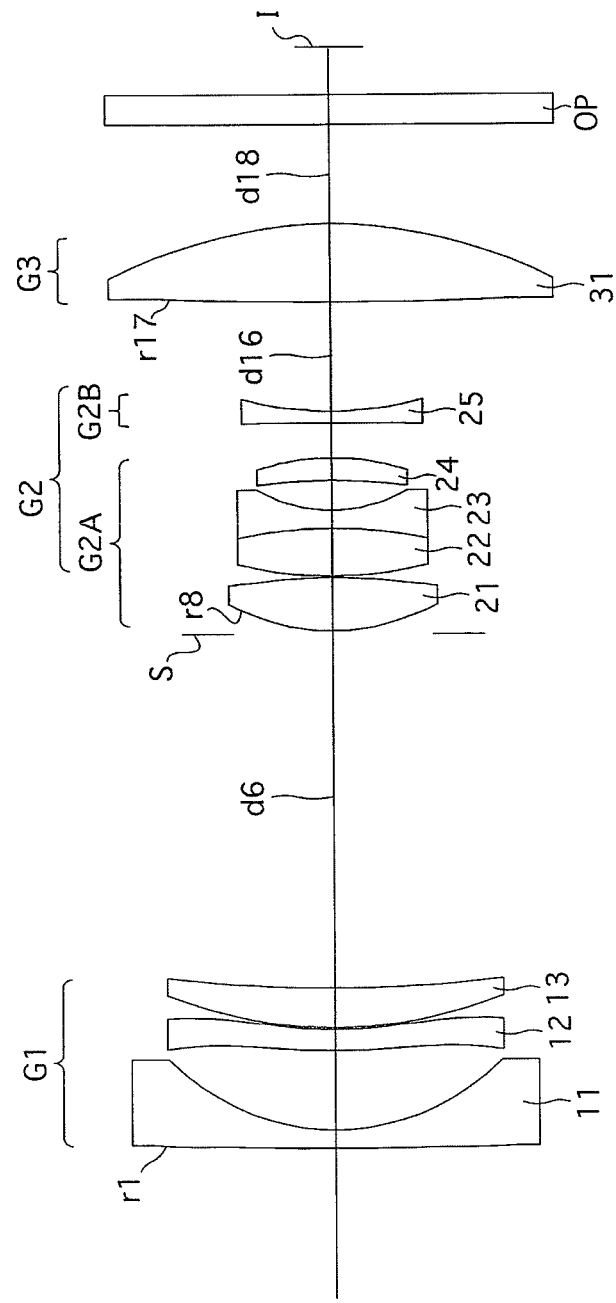
FIG. 17 shows a lens arrangement of a fifth numerical embodiment of a zoom lens system, according to the present invention, at the short focal length extremity when focused on an object at infinity.

FIGS. 17 through 20D and Tables 17 through 20 show a fifth numerical embodiment of a zoom lens system according to the present invention. FIG. 17 shows a lens arrangement of the fifth numerical embodiment when focused on an object at infinity at the short focal length extremity. FIGS. 18A, 18B, 18C and 18D show various aberrations that occurred in the lens arrangement shown in FIG. 17 at the short focal length extremity when focused on an object at infinity. FIGS. 19A, 19B, 19C and 19D show various aberrations that occurred in the lens arrangement shown in FIG. 17 at an intermediate focal length when focused on an object at infinity. FIGS. 20A, 20B, 20C and 20D show various aberrations that occurred in the lens arrangement shown in FIG. 17 at the long focal length extremity when focused on an object at infinity. Table 17 shows the lens surface data, Table 18 shows various zoom lens system data, Table 19 shows the aspherical surface data, and Table 20 shows the lens group data of the zoom lens system according to the fifth numerical embodiment.

The lens arrangement of the fifth numerical embodiment is the same as that of the first numerical embodiment.

TABLE 17

SURFACE DATA

| Surf. No. | r | d | Nd | vd |
|---|---|---|---|---|
| 1 | 500.000 | 1.200 | 1.80420 | 46.5 |
| 2 | 15.945 | 5.228 | | |
| 3* | 42.360 | 1.400 | 1.54358 | 55.7 |
| 4* | 27.963 | 0.105 | | |
| 5 | 30.983 | 2.617 | 1.84666 | 23.8 |
| 6 | 98.717 | d6 | | |
| 7(Diaphragm) | ∞ | 0.200 | | |
| 8* | 13.791 | 3.542 | 1.69350 | 53.2 |
| 9* | −36.511 | 0.100 | | |
| 10 | 27.027 | 3.180 | 1.61800 | 63.4 |
| 11 | −29.985 | 1.200 | 1.67270 | 32.2 |
| 12 | 10.191 | 1.994 | | |
| 13 | −37.815 | 1.477 | 1.72916 | 54.7 |
| 14 | −16.106 | 2.299 | | |
| 15 | −503.778 | 0.800 | 1.77250 | 49.6 |
| 16 | 24.493 | d16 | | |

TABLE 17-continued

SURFACE DATA

| Surf. No. | r | d | Nd | vd |
|---|---|---|---|---|
| 17* | 335.379 | 5.187 | 1.54358 | 55.7 |
| 18* | −28.721 | d18 | | |
| 19 | ∞ | 2.000 | 1.51680 | 64.2 |
| 20 | ∞ | — | | |

The asterisk (*) designates an aspherical surface which is rotationally symmetrical with respect to the optical axis.

TABLE 18

ZOOM LENS SYSTEM DATA
Zoom Ratio 3.30

| | Short Focal Length Extremity | Intermediate Focal Length | Long Focal Length Extremity |
|---|---|---|---|
| FNO. | 2.9 | 4.1 | 5.7 |
| f | 16.22 | 29.34 | 53.51 |
| W | 47.1 | 25.9 | 15.0 |
| Y | 14.20 | 14.20 | 14.20 |
| fB | 3.182 | 3.182 | 3.182 |
| L | 72.89 | 72.25 | 85.00 |
| d6 | 23.448 | 9.930 | 2.514 |
| d16 | 7.235 | 21.860 | 45.775 |
| d18 | 6.500 | 4.746 | 1.000 |

TABLE 19

Aspherical Surface Data (the aspherical surface coefficients not indicated are zero (0.00)):

| Surf. No. | K | A4 | A6 | A8 |
|---|---|---|---|---|
| 3 | 0.000 | −0.1206E−03 | 0.3393E−06 | −0.7784E−09 |
| 4 | 0.000 | −0.1400E−03 | 0.4050E−06 | −0.1029E−08 |
| 8 | −1.042 | 0.2580E−05 | 0.1078E−06 | |
| 9 | 0.000 | 0.6311E−04 | −0.9766E−07 | |
| 17 | 0.000 | −0.2043E−05 | 0.3878E−07 | −0.1706E−09 |
| 18 | 0.000 | 0.1416E−04 | 0.1754E−07 | −0.1572E−09 |

TABLE 20

LENS GROUP DATA

| Lens Group | 1$^{st}$ Surf. | Focal Length |
|---|---|---|
| 1 | 1 | −29.65 |
| 2 | 8 | 22.80 |
| (2A | 8 | 17.657) |
| (2B | 15 | −30.216) |
| 3 | 17 | 48.91 |

The numerical values of each condition for each embodiment are shown in Table 21.

TABLE 21

| | Embod. 1 | Embod. 2 | Embod. 3 |
|---|---|---|---|
| Cond. (1) | −0.956 | −1.051 | −0.920 |
| Cond. (2) | −2.021 | −2.142 | −1.930 |
| Cond. (3) | 55.46 | 55.46 | 55.46 |
| Cond. (4) | 0.063 | 0.063 | 0.061 |
| Cond. (5) | 0.694 | 0.313 | 0.891 |
| Cond. (6) | 1.175 | 1.155 | 1.206 |
| Cond. (7) | 0.178 | 0.160 | 0.179 |

TABLE 21-continued

| | Embod. 4 | Embod. 5 |
|---|---|---|
| Cond. (1) | −0.821 | −0.755 |
| Cond. (2) | −1.737 | −1.618 |
| Cond. (3) | 54.67 | 49.60 |
| Cond. (4) | 0.056 | 0.055 |
| Cond. (5) | 0.838 | 0.907 |
| Cond. (6) | 1.210 | 1.145 |
| Cond. (7) | 0.224 | 0.189 |

As can be understood from Table 21, the first through fifth embodiments satisfy conditions (1) through (7). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, and a positive third lens group, in that order from the object side, wherein upon zooming from the short focal length extremity to the long focal length extremity, the distance between said first lens group and said second lens group decreases, and the distance between said second lens group and said third lens group increases, wherein said second lens group includes a positive first sub-lens group and a negative second sub-lens group, in that order from the object side, and wherein said second sub-lens group comprises a negative single lens element which serves as an image-stabilizer lens group which is moved in a direction orthogonal to the optical axis to change the imaging position of said zoom lens system in order to correct image shake.

2. The zoom lens system according to claim 1, wherein the following condition (1) is satisfied:

$$-1.5 < F2/F2B < -0.7 \quad (1),$$

wherein

F2 designates the focal length of said second lens group, and

F2B designates the focal length of said negative single lens element of said second sub-lens group.

3. The zoom lens system according to claim 1, wherein the following condition (2) is satisfied:

$$-3 < (1-M2BT)*M3T < -1.5 \quad (2),$$

wherein

M2BT designates the lateral magnification of said negative single lens element of said second sub-lens group when focused on an object at infinity at the long focal length extremity; and M3T designates the lateral magnification of said third lens group when focused on an object at infinity at the long focal length extremity.

4. The zoom lens system according to claim 1, wherein the following condition (3) is satisfied:

$$\nu 2B > 45 \quad (3),$$

wherein

ν2B designates the Abbe number with respect to the d-line of said negative single lens element of said second sub-lens group.

5. The zoom lens system according to claim 1, wherein said negative single lens element of said second sub-lens group comprises a focusing lens group which is moved along the optical axis direction during a focusing operation, and wherein the following condition (4) is satisfied:

$$T2B/T2<0.1 \qquad (4),$$

wherein
- T2B designates the distance along the optical axis from the surface of said negative single lens element of said second sub-lens group that is closest to the object side to the surface of said negative single lens element of said second sub-lens group that is closest to the image side, and
- T2 designates the distance along the optical axis from the surface of said second lens group that is closest to the object side to the surface of said second lens group that is closest to the image side.

6. The zoom lens system according to claim 1, wherein the following condition (6) is satisfied:

$$1.05<M3T/M3W<1.35 \qquad (6),$$

wherein
- M3T designates the lateral magnification of said third lens group when focused on an object at infinity at the long focal length extremity, and
- M3W designates the lateral magnification of said third lens group when focused on an object at infinity at the short focal length extremity.

7. The zoom lens system according to claim 1, wherein said first sub-lens group of said second lens group comprises a positive lens element, a positive lens element, a negative lens element, and a positive lens element, in that order from the object side.

8. The zoom lens system according to claim 1, wherein said first lens group comprises a negative lens element, a negative lens element having an aspherical surface on at least one side thereof, and a positive lens element, in that order from the object side; and wherein the following condition (7) is satisfied:

$$0<F1/FA<0.4 \qquad (7),$$

wherein
- F1 designates the focal length of said first lens group; and
- FA designates the focal length of said negative lens element having an aspherical surface on at least one side thereof.

9. A zoom lens system comprising a negative first lens group, a positive second lens group, and a positive third lens group, in that order from the object side, wherein upon zooming from the short focal length extremity to the long focal length extremity, the distance between said first lens group and said second lens group decreases, and the distance between said second lens group and said third lens group increases,
- wherein said second lens group includes a positive first sub-lens group and a negative second sub-lens group, in that order from the object side,
- wherein said second sub-lens group serves both as an image-stabilizer lens group that corrects image shake by moving in a directions orthogonal to the optical axis to change the imaging position, and as a focusing lens group which moves in the optical axis direction during a focusing operation.

10. The zoom lens system according to claim 9, wherein said second sub-lens group comprises a negative single lens element.

11. The zoom lens system according to claim 10, wherein the following condition (5) is satisfied:

$$0<(RA+RB)/(RA-RB)<3 \qquad (5),$$

wherein
- RA designates the radius of curvature of the surface on the object side of said negative single lens element of said second sub-lens group, and
- RB designates the radius of curvature of the surface on the image side of said negative single lens element of said second sub-lens group.

* * * * *